United States Patent Office

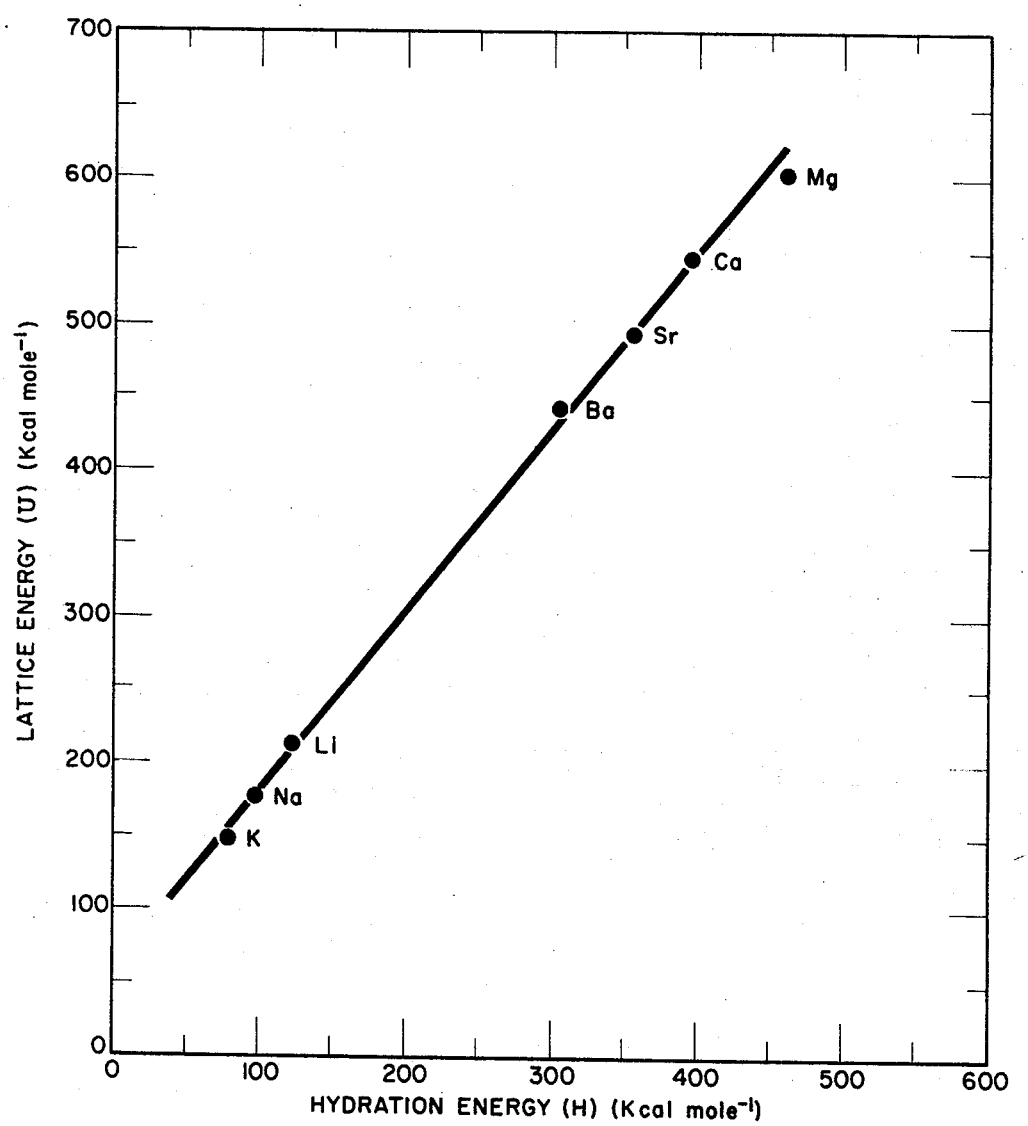

3,755,447
Patented Aug. 28, 1973

3,755,447
POLYALKYLENE POLYAMINE SEPARATION
AND PURIFICATION
Lawrence P. Klemann, Somerville, Thomas A. Whitney, Linden, and Arthur W. Langer, Jr., Watchung, N.J., assignors to Esso Research and Engineering Company
Filed Nov. 26, 1971, Ser. No. 202,380
Int. Cl. C07c 85/16
U.S. Cl. 260—563                                   7 Claims

ABSTRACT OF THE DISCLOSURE

This invention relates to a process for the separation and purification of polyalkylene polyamines such as occur in commercial mixtures via the selective formation of a complex between a polyamine and an inorganic salt wherein the metal portion of said salt is a metal selected from the group consisting of lithium, sodium, potassium, magnesium, calcium, strontium and barium. This process has the advantage of operating with very high selectivities in the absence of large amounts of water and it permits recovery of the pure amines with no prior modification by methylation.

---

This invention relates to a process for the separation and purification of commercial mixtures of polyalkylene polyamines. In one aspect, this invention relates to the selective formation of a complex between a polyamine present in said commercial mixture and an appropriate inorganic salt.

It has been shown that tertiary polyamine bases can be separated from one another based upon their relative complexing affinities for lithium in a copending application bearing Ser. No. 872,955 filed on Oct. 31, 1969 and abandoned on Apr. 23, 1972 in the name of Arthur W. Langer, Jr. and Thomas A. Whitney. In another copending case, there has been described a method for the separation of tertiary chelating polyamines using inorganic salts of metals other than lithium. This process is described in patent application bearing Ser. No. 202,658 filed Nov. 26, 1971.

However, in the area of the subject application, there have been few successful commercial operations up to the present time for separating mixtures of polyamines which contain primary amino groups. The techniques employed heretofore have included selective precipitation of hydrochloride salts, nitrate salts and hydrates.

Recently issued Japanese patent identified as publication No. 3364/71 and assigned to the Seitetsu Kagaku Kogyo Company, describes a method for separating polyethylene polyamines containing triethylenetetramine as the main component. This process involves the addition of water to the polyethylene polyamine mixture so as to precipitate a hydrate of triethylenetetramine. Zinc or copper, chloride or sulfate is then added to the mother liquor from which the triethylenetetramine hydrate has been precipitated so as to form a complex of metal-acyclic polyethylene polyamines.

If the latter complex is a solid, it is isolated by filtration. If, on the other hand the complex is not a solid, the remaining uncomplexed components are separated by conventional solvent extraction technique.

Godfrey, in U.S. 3,038,904, describes a method by which metal salts of copper, nickel, cobalt and zinc are used in protic media for separating mixtures of amines into fractions from which individual components may be more readily recovered by ordinary means of separation. This process is applied to di- and triamine mixtures containing at least one cyclic and one acyclic component. However, this process is inoperable in non-protic solvents, such as tetrahydrofuran, benzene, etc.

Principal disadvantages of the processes cited above include the low complexing selectivity for individual components from the more complex mixtures as well as the virtually unavoidable necessity to recover product from protic media and/or cosolvents.

An object of the subject invention is to provide a process for separating and purifying commercial mixtures of polyalkylene polyamines.

Another object of the present invention is to provide a method for selectively forming a complex between a polyamine and an appropriate inorganic salt.

Yet another object of the instant invention is to provide a process which operates with very high selectivity in the absence of large amounts of protic solvents, i.e. the process is substantially or completely anhydrous. In addition, the present invention permits recovery of pure amines requiring no prior modification by N-methylation or other chemical transformation.

Briefly, this invention relates to a process comprising the steps of (1) forming a complex of at least one polyalkylene polyamine contained in said mixture with an inorganic salt of a metal, said metal being selected from the group consisting of lithium, sodium, potassium, magnesium, calcium, strontium and barium; (2) separating the complex resulting in step (1), and (3) recovering the amine by destabilization of the complex formed in step (1).

Not all salts of the metals listed above are useful in this invention. The lattice energies of the salts employed in the present invention are critical. In other words, polyamine complex formation will not occur with salts of a given metal having a lattice energy above a critical value. Furthermore, the maximum usable lattice energy for a salt of each metal is related to the salt's hydration energy such that a linear relationship has been experimentally determined for the lattice energy and hydration energy of all salts which meet the minimum requirements for complex formation in the instant invention. This relationship is shown in the accompanying figure.

Inorganic salts having lattice energies less than or equal to those shown in the figure are useful in this invention. The maximum lattice energy in kcal./mole for useful salts of each metal is about as follows: lithium 214, sodium 180, potassium 149, magnesium 604, calcium 544, strontium 492 and barium 445. It should be understood that the above lattice energy values are not absolute and are taken from M. F. C. Todd and W. H. Lee, in H. Reiss, ed, "Prog. Solid State Chem.," vol. I, Pergamon Press, London, 1964; and A. Kapustinsky and B. Weselowsky, Z. Physikal Chem., (B), 22, 261 (1933).

Specific nonlimiting examples of useful metal salts are those in which the anion is azide, cyanide, chloride, bromide or iodide, borohydride, nitrate, nitrite, thiocyanate, perchlorate, etc.

Nonlimiting examples of suitable salts include lithium nitrite, lithium nitrate, lithium chloride, lithium bromide, lithium iodide, sodium nitrate, sodium thiocyanate, sodium borohydride, sodium bromide, sodium iodide, potassium iodide, magnesium chloride, magnesium bromide, magnesium iodide, magnesium nitrate, calcium chloride, calcium bromide, strontium chloride, strontium bromide, barium bromide and barium iodide.

Preferably, the salts employed will have a lattice energy slightly below the maximum for each metal as this situation will produce a polyamine•salt complex with the lowest dissociation temperature for the particular metal in question. For example, in the sodium series raising the lattice energy of the salt by less than 11 kilocals per mol (difference between the lattice energies of sodium iodide and sodium bromide) the decomposition temperature of the triethylenetetramine·salt complex is lowered by 54° C. (from 191° C. to 137° C. respectively). It is also to be noted that the most preferred salts are those which are substantially anhydrous.

Preferred salts include lithium nitrate, lithium chloride, lithium bromide, lithium iodide, sodium nitrate, sodium thiocyanate, sodium bromide, sodium iodide, potassium iodide, magnesium chloride, magnesium bromide, magnesium nitrate, calcium chloride, calcium bromide, strontium chloride, strontium bromide and barium iodide. Most preferred are the salts of lithium, sodium, magnesium and calcium.

The compounds which may be separated by the process described herein are those found in commercial polyalkylene polyamine fractions, [e.g. diaminocyclohexane (DACH), diethylenetriamine (DETA), triethylenetetramine (TETA), tetraethylenepentamine (TEPA), pentaethylenehexamine (PEHA), etc.]. The fractions are mixtures of cyclic, linear and branched isomers and/or homologous compounds having one or more primary amino groups.

Specific compounds which are found in commercial polyalkylene polyamine fractions are included (with their respective abbreviations) in the following list:

1,4-diazabutane (en),
piperazine (c-eda),
1,4,7-triazaheptane (dien),
N-(3-azapropyl)piperazine (c-deta),
4-(3-azapropyl)-1,4,7-triazaheptane (tren),
1,4,7,10-tetrazadecane (trien),
N,N'-bis(3-azapropyl)piperazine (N,N'-c-teta),
N-(3,6-diazahexyl) piperazine (N-c-teta),
4-(3-azapropyl)-1,4,7,10-tetrazadecane (trenen),
1,4,7,10,13-pentazatridecane (tetren),
N-(3-azapropyl)-N'-(3,6-diazahexyl) piperazine (N,N'-c-tepa),
N-(3,6,9-triazanonyl) piperazine (N-c-tepa),
N-[3-(3-azapropyl)-3,6-diazahexyl] piperazine (N,3-c-tepa),
4-(3-azapropyl)-1,4,7,10,13-pentazatridecane (4-trendien),
7-(3-azapropyl)-1,4,7,10,13-pentazatridecane (7-trendien),
1,4,7,10,13,16-hexazahexadecane (penten),
cis-1,2-diaminocyclohexane (cis-DACH),
trans-1,2-diaminocyclohexane (trans-DACH), etc.

Structures for the above compounds appear in the following table:

TABLE I

| Formula | Abbreviation |
|---|---|
| NH₂–⌒–NH₂ | en |
| HN⟨ ⟩NH | c-eda |
| NH₂–⌒–NH–⌒–NH₂ | dien |
| HN⟨ ⟩N–⌒–NH₂ | c-deta |
| NH₂–⌒–NH–⌒–NH–⌒–NH₂ | trien |
| N(–CH₂–NH₂)₃ | tren |
| NH₂–⌒–N⟨ ⟩N–⌒–NH₂ | N,N'-c-teta |
| NH₂–⌒–NH–⌒–N⟨ ⟩NH | N-c-teta |
| NH₂–⌒–NH–⌒–NH–⌒–NH–⌒–NH₂ | tetren |
| N with three branches (NH₂, NH–NH₂, NH₂) | trenen |
| NH₂–⌒–N⟨ ⟩N–⌒–NH–⌒–NH₂ | N,N'-c-tepa |
| NH–⌒–N⟨ ⟩–⌒–NH–⌒–NH–⌒–NH₂ | N-c-tepa |
| HN⟨ ⟩N–⌒–N(–⌒–NH₂)(–⌒–NH₂) | N,3-c-tepa |

TABLE I—Continued

| Formula | Abbreviation |
|---|---|
|  NH$_2$  NH  NH  NH  NH  NH$_2$ | penten |
|  | trans-DACH |
|  | cis-DACH |

The process by which this invention may be practiced involves three steps: viz, complexation, separation of the salt chelate and recovery of the purified amine. A particular component may be separated from a polyalkylene polyamine mixture such as stated hereinabove by first adding to it a quantity of metallic salt which will preferentially form a complex with a single amine component. The amine may be a major or minor constituent of the mixture. The contacting of the multi-component mixture may be under homogeneous or heterogeneous conditions. The quantity of the metal salt is determined by the particular complex to be formed and the amount of salt may be more or less than the stoichiometric quantity of the component to be complexed, e.g. from 0.1 to 20 moles of salt per mole of amine. Preferably, a stoichiometric amount or less of salt is employed.

The complexation step may be carried out in the absence of solvent or in the presence of a diluent such as benzene, tetramethylethylenediamine, pentamethyldiethylenetriamine, ethylenediamine, tetrahydrofuran, chlorobenzene, toluene, and other such solvents. Substantially anhydrous diluents are preferred although minor amounts of water in this system can be tolerated.

After its formation, the complex, which is usually a solid, may be isolated from the multicomponent mixture (e.g. by precipitation or filtration) leaving behind an effluent.

Destabilization of the complex is readily accomplished by additions of polar solvents to the complex (e.g. addition of water, ethylene, glycol, methanol, etc.); addition of aqueous or anhydrous acids or bases (e.g. hydrochloric acid, sulfuric acid, acetic acid, sodium hydroxide, ammonium hydroxide, potassium hydroxide, etc.) or by heating the complex at a temperature in the range of about 30 to 250° C.; liberated polyethylene polyamine in its basic form may then be recovered by conventional methods (e.g. distillation, extraction, etc.). A component remaining in the effluent may be recovered by repetition of the above process using the same or a different metal salt if the effluent is still a mixture of polyamines. Alternatively, if only a single component remains in the effluent, it may be recovered by distillation, extraction, or crystallization, etc.

The purification and/or separation process described above may of course be facilitated by countercurrent flow techniques, i.e. the metallic salt (complexed or uncomplexed) may be contacted with a countercurrent flow of a hydrocarbon solution of the polyamine mixture and the resulting complex may then be subjected to destabilization to recover the amine in a pure state.

Since the specific complexes which can be obtained by the above process exhibit distinct dissociation temperatures within the temperature range of from about 0° to 300° C., this temperature range serves as the operational temperature within which this invention can be practiced. It is generally advantageous however, to select a metallic salt such that a stable complex is formed with only one amine in the polyalkylene polyamine mixture between about 10° and 100° C., most preferably at or near ambient temperature.

It is desirable in utilizing this invention to predict the ease of formation of the various possible salt amine complexes in the mixture. Such determination depends directly on the relative stability of the various complexes, i.e., the most stable complexes are formed preferentially followed by the next most stable complexes, etc. Generally, if the amine forms a five-membered ring including the metal atom, this complex will be more stable than the correspondingly formed six-membered ring which in turn will be more stable than the correspondingly formed seven member ring (which is of approximately equivalent stability to the four-membered ring).

When the ring sizes formed by the amines to be separated are equal it is still possible to predict the more readily formed complex on the basis of entropy considerations. The amine with the smallest negative entropy change upon forming a complex will complex preferentially.

Other factors to be considered and which will become especially important when ring size and entropy considerations as discussed above are essentially equivalent, are steric hindrance and the respective nitrogen-nitrogen distances of the amines to be separated.

Of course, stability also depends on the temperature of the reaction medium. As stated hereinabove, the temperature of this reaction usually falls in the range of from 0° to 200° C. It should be understood that higher temperatures favor dissociation of the less stable complexes. Temperatures then can be adjusted to selectively complex a particular component of a polyamine mixture.

Another factor to be considered is the metal salt employed, i.e., its lattice energy and amount (previously discussed). The higher the lattice energy, the more selective complex formation will be, i.e., only chelating amines capable of forming quite stable complexes will combine with metal salts having lattice energies near the previously stated maximum. Where the resulting complexes are of such similar structure that their relative stabilities cannot be accurately predicted, a trial run followed by appropriate adjustment of temperature concentration and/or use or a different metal salt will still attain a desired separation.

It should be noted that complexation readily occurs by mixing the proper metal salt with the amine in the absence of solvent; however, such mixing may also be accomplished in the presence of inert hydrocarbons, e.g. $C_4$–$C_{20}$ alkanes (e.g. pentane, heptane, hexadecane); $C_6$–$C_{20}$ aromatics (e.g., benzene, toluene, xylene, dibutylnaphthalene); halogenated aromatics (e.g. chlorobenzene, dichlorobenzene, hexafluorobenzene); heterocyclic compounds (e.g., pyridine, pyrrole, furan, thiophene, sulfolane, borazole); or mixtures thereof.

The amount of the diluent is not critical and amounts in the range of 0 to 99.9 wt. percent based on the complex, may be conveniently employed. Thus, the complex can be prepared in the absence of solvents, in the form of pastes and in solvents.

A particularly attractive and useful recovery of the purified amine from the salt complex involves extraction of the salt complex with an aliphatic hydrocarbon or mixture thereof (e.g., heptane, tetradecane, Isopar G, etc.). Isopar G is a narrow-cut isoparaffinic hydrocarbon fraction having a boiling point range of approximately 160–177° C.

The salt complex is insoluble in such a medium but the salt complex can be dissociated in such a medium at elevated temperatures (e.g. 50–250° C.) to give an insoluble inorganic salt and a soluble amine component. Upon cooling the polyamine solution in the absence of metal salt, the polyamine separates as a lower phase due to its limited solubility in a nonpolar medium at or near room temperature. The purified polyamine, containing ca. 1–3 wt. percent of hydrocarbon solvent, is isolated by separating this two phase mixture. The remaining solvent is normally innocuous but it can be removed by any conventional method such as distillation or vacuum stripping. The metal salt may then be recycled to effect further polyamine separation.

This invention is illustrated but not limited by the following examples. (The abbreviations of the amines employed in the examples have been defined hereinabove and are used for the sake of brevity.)

EXAMPLE 1

Crude TETA (116 g.) was combine dwith 26 g. of water and this mixture was allowed to stand overnight at room temperature (25° C.) whereupon a crystalline mass of TETA-hydrate was obtained. Filtration followed by cooling of the filtrate in ice afforded a second crop of TETA-hydrate. The mother liquor which remained (30.95 g.) was combined with a saturated solution of sodium bromide (10.92 g.) in 10 ml. of water. This mixture was stirred overnight then was allowed to stand undisturbed for an additional day (the mixture remained homogeneous). n-Butanol (10.92 g.) was added and this solution was stirred vigorously then was allowed to stand for five days. The solution remained clear.

This experiment shows that a mixture of polyethylene polyamines is not separated by sodium bromide in the presence of substantial amounts of water.

EXAMPLE 2

TETA (21 ml.), sodium bromide (9.9 g.), and ethylenediamine (EDA), 40 ml. were stirred for one hour after which time the EDA was vacuum stripped and benzene (40 ml.) was added to the residue. The precipitated solid, after filtration and drying, weighed 23.6 g. (quantitative yield). The results of an analysis made on the amines present in this solid are given in the following table.

TABLE II

| Components | Percent TETA | NaBr complex |
| --- | --- | --- |
| dien | 0.5 | 0.0 |
| tren | 8.4 | 5.1 |
| trien | 74.6 | 93.9 |
| cyclic-teta isomers | 16.5 | 1.0 |

This example shows that complexation with NaBr separates acyclic from cyclic polyamines and, at equilibrium, complexation of the linear acyclic is preferred.

EXAMPLE 3

A mixture containing 6 mmoles each of tren and trien was contacted with a solution of sodium bromide (5.4 mmole) in 6 ml. of EDA. After 90 hours, the EDA was vacuum stripped and benzene (15 ml.) was added to the remaining clear solution to precipitate the complex. Filtration afforded 1.0 g. (75%) of tren•NaBr which contained 99.2% pure tren.

The example shows that the branched isomer is selectively complexed from a 1:1 mixture of tren and trien.

EXAMPLE 4

Sodium bromide (5.4 mmole) in 2.2 ml. of EDA was added to 10.3 g. of crude TETA cooled by means of an toluene was added to precipitate the 1:1 polyamine:sodium bromide complex. The latter was filtered, dried and the polyamine component was analyzed for tren and trien (the only polyamines present).

TABLE III

| Elapsed time (min.) | Composition (percent) | |
| --- | --- | --- |
| | tren | trien |
| 0 (crude TETA) | a 8.4 | a 74.6 |
| 5 | 99.5 | 0.5 |
| 15 | 76.5 | 23.5 |
| 45 | 48.5 | 51.5 |
| 60 | 4.3 | 95.7 |
| 75 | 5.6 | 94.4 | a The remaining 17% dien and cyclic-teta isomers.

This example shows that with a typical, commercial TETA mixture, separation of either acyclic tetramine component may be accomplished depending upon whether kinetically or thermodynamically controlled complexation is used.

EXAMPLE 5

A 1.17 g. sample of TETA (containing 81.9% tren) was combined with chlorobenzene (7 ml.) and sodium bromide (0.61 g.) and this slurry was stirred for 24 hours. The white solid was isolated by filtration and was dried (yield 1.43 g., quantitative) The complex was found to contain 98.8% pure tren.

The example shows that selective complexation can occur under heterogeneous conditions.

EXAMPLE 6

Solid tren•NaBr (12.5 g.) complex was loaded in an Alundum extraction thimble which was placed in a Soxhlet extractor. After extraction with 250 ml. of Isopar G (B.P. 157–175° C.) the solution was cooled to room temperature producing a phase separation. The lower liquid phase (containing pure tren and 1–3 wt. percent Isopar G) was removed. The results of several extraction runs are tabulated below.

TABLE IV

| Run | Extraction time (hours) | Wt. tren recovered (g.) | Wt. NaBr recovered (g.) |
| --- | --- | --- | --- |
| 1 | 8 | a 5.0 | b 5.3 |
| 2 | c 6 | 7.3 | 5.1 |
| 3 | 4 | 4.9 | 5.3 |
| 4 | c 2 | 7.4 | 5.3 | a Theoretical weight 7.3 g.
b Theoretical weight 5.2 g.
c Isopar G recovered from previous run was reused.

This example shows that polyamine may be recovered from the salt complex by heating the latter in a hydrocarbon solvent. The polyamine has a finite solubility (tren ≈0.9 g./100 ml.) in the aliphatic hydrocarbon solvent at room temperature (compare tren recovered from Runs 1 and 3 with Runs 2 and 4). Solvent recycle is possible (Runs 2 and 4) and leads to quantitative recovery of polyamine.

EXAMPLE 7

A 1.17 g. sample of TETA (containing 81.9% tren) was combined with six mmoles of an inorganic salt and seven ml. of benzene. After stirring for 65 hours the solid was filtered, dried, weighed and the amount of complex formed was determined as a function of the lattice energy of the inorganic salt.

TABLE V

| Inorganic salt | Lattice energy, Kcal. mol$^{-1}$ | Percent complexation |
| --- | --- | --- |
| LiCl | 195–206 | 94.4 |
| LiNO$_3$ | 214 | 90.8 |
| LiH | 217–234 | 0 |
| NaSCN | 163–178 | 95.0 |
| NaNO$_3$ | 173–181 | 38.8 |
| NaCl | 185–186 | 0 |
| KI | 149–154 | 37.0 |
| KBH$_4$ | 159 | 0 |
| RbI | 144 | 0 |
| CaCl$_2$ | 546 | 39.6 |
| SrCl$_2$ | 494 | 51.0 |
| BaI$_2$ | 444 | ~100 |

This example shows that only those salts with lattice energies less than some critical value can function as complexing agents for the tetramines. The rate of complexation is also dependent on lattice energy.

EXAMPLE 8

One gram of TETA (containing 81.9% tren) was combined with 0.48 g. of MgCl$_2$ and 25 ml. of tetrahydrofuran. This mixture was stirred for seven days and the complex isolated by filtration (yield, quantitative). Analysis of the polyamine portion of the complex showed it to be 91.5% tren and 8.5% trien.

This example shows that magnesium salts may also be used to upgrade the purity of a polyamine mixture.

EXAMPLE 9

Crude TETA (10.3 g.) and sodium bromide (0.55 g.) were stirred for 65 hours after which time the white solid present was filtered and dried (yield 1.26 g., 94%). Analysis of the solid complex showed it to contain 100% pure trien.

This example shows that selective complexation can occur in neat polyalkylene polyamine.

EXAMPLE 10

DACH (0.6 g., 5.5 mmol) in 8 ml. of benzene and LiBr (0.13 g., 1.5 mmol) were stirred vigorously and samples of the supernatant liquid were periodically analyzed.

TABLE VI

| | (Percent) DACH isomer distribution | |
| --- | --- | --- |
| Time elapsed | cis | trans |
| 0 | 41.6 | 58.4 |
| 30 min | 34.0 | 66.0 |
| 60 min | 9.5 | 90.5 |
| 65 hr | 10.0 | 90.0 |

This example shows that cis-DACH is preferentially complexed by LiBr (trans-DACH is left in solution). The complex formed has the stoichiometry (DACH)$_2$LiBr.

Analytical calculation for (DACH)$_2$·LiBr (percent): C, 45.72; H, 8.95; N, 17.77. Found (percent): C, 46.62; H, 8.74; N, 17.75.

EXAMPLE 11

Impure tren (1.0 g.), anhydrous nickel chloride (0.65 g.) and 25 ml. of tetrahydrofuran were stirred overnight whereupon filtration afforded a small amount of a solid and a liquid residue. Analysis of the latter showed the purity of the tren to be unchanged within experimental error.

This example shows that nickel chloride is not useful for the purification of tren in anydrous media.

What is claimed is:

1. A process for separating and purifying polyalkylene polyamines containing cyclic, linear and branched structures having 1 or more primary amino groups which occur in commercial mixtures, said process comprising the steps of:
   (1) forming a complex either in the absence of a solvent or in the presence of a substantially anhydrous nonprotic solvent of at least one polyalkylene polyamine contained in said mixture with a metal compound, said metal being one selected from the group consisting of lithium, sodium, potassium, magnesium, calcium, strontium and barium and being in the form of a salt having a lattice energy of less than or equal to about 214 kcal./mole for Li, 180 kcal./mole for Na, 154 kcal./mole for K, 604 kcal./mole for Mg, 546 kcal./mole for Ca, 494 kcal./mole for Sr and 444 kcal./mole for Ba measured at 298 degrees Kelvin, whereby a solid complex is formed of substantially that one of said polyalkylene polyamines contained in said mixture which forms the most stable complex with said metal salt;
   (2) separating the solid metal salt amine complex formed in step (1) and leaving behind an effluent;
   (3) successively repeating steps (1) and (2) whereby the next most stable complexes are formed preferentially until
      (a) the complex which results is that of the desired amine or
      (b) the effluent comprises a substantially pure single amine, and
      (c) recovering the desired amine by destabilization of the complex from step (3)(a) or recovering the desired amine from the effluent of step (3)(b).

2. The process according to claim 1 wherein said mixture of polyalkylene polyamines consists essentially of diethylenetriamine, triethylenetetramine, tetraethylenepentamine and pentaethylenehexamine containing cyclic, linear and branched structures.

3. A process according to claim 1 in which the anion of the metal salt is one selected from the group consisting of chloride, bromide, iodide, nitrate, hexafluorophosphate, tetrafluoroborate, tetraphenylborate, perchlorate, azide, hexafluoroarsenate, tetrafluoroberyllate, thiocyanate and nitrite.

4. A process according to claim 1 wherein the metal salts are ones selected from the group consisting of lithium nitrate, lithium chloride, lithium bromide, lithium iodide, sodium nitrate, sodium thiocyanate, sodium bromide, sodium iodide, potassium iodide, magnesium chloride, magnesium bromide, magnesium nitrate, calcium chloride, calcium bromide, strontium chloride, strontium bromide and barium iodide.

5. A process according to claim 2 wherein diaminocyclohexane is separated from a mixture of cyclohexane diamines.

6. A process according to claim 2 wherein cis-1,2-diaminocyclohexane is separated from trans-1,2-diaminocyclohexane.

7. A process according to claim 1 wherein 4-(3-azapropyl)-1,4,7-triazaheptane is separated from triethylenetetramine.

References Cited

UNITED STATES PATENTS 3,038,904    6/1962    Godfrey _____ 260—583 N

FOREIGN PATENTS 463,364    1/1971    Japan _____ 260—563 R

OTHER REFERENCES

Ito et al.: "Chem. Abstracts," vol. 75 (1971), # 48409n.

LEWIS GOTTS, Primary Examiner

D. R. PHILLIPS, Assistant Examiner

260—268, 583 N, 583 P, 583 R, 4295, 5705, 576, 577, 582

UNITED STATES PATENT OFFICE
CERTIFICATE OF CORRECTION

Patent No. 3,755,447           Dated August 28, 1973

Inventor(s) Lawrence P. Klemann, Thomas A. Whitney, Arthur W. Langer, Jr.

It is certified that error appears in the above-identified patent and that said Letters Patent are hereby corrected as shown below:

Column 2, line 57, after "etc!", please add -- Preferred anions include chloride, bromide, iodide, nitrate, hexafluorophosphate, tetrafluoroborate, tetraphenylborate, perchlorate, azide, hexafluoroarsenate, tetrafluoroberyllate, thiocyanate and nitrite.--

Signed and sealed this 23rd day of April 1974.

(SEAL)
Attest:

EDWARD M. FLETCHER, JR.          C. MARSHALL DANN
Attesting Officer                Commissioner of Patents